United States Patent [19]

Dinulescu et al.

[11] 4,292,062
[45] Sep. 29, 1981

[54] CRYOGENIC FUEL TANK

[76] Inventors: Horia A. Dinulescu, 1615 S. 4th St., #M2904, Minneapolis, Minn. 55454; Nicholas A. Sanders, 109½ E. 2nd St., Hastings, Minn. 55033

[21] Appl. No.: 132,140

[22] Filed: Mar. 20, 1980

[51] Int. Cl.³ ............................................. F25B 19/00
[52] U.S. Cl. ........................................... 62/7; 62/240
[58] Field of Search .......................... 62/7, 45, 54, 240

[56] References Cited

U.S. PATENT DOCUMENTS

| | | | |
|---|---|---|---|
| 2,795,937 | 6/1957 | Sattler et al. | 62/7 |
| 2,940,268 | 6/1960 | Morrison | 62/7 |
| 3,602,003 | 8/1971 | Hampton | 62/54 |
| 3,605,425 | 9/1971 | Cuneo et al. | 62/54 |
| 3,850,001 | 11/1974 | Looke | 62/54 |
| 3,864,918 | 2/1975 | Lorenz | 62/7 |

Primary Examiner—Ronald C. Capossela
Attorney, Agent, or Firm—Williamson, Bains, Moore & Hansen

[57] ABSTRACT

A fuel tank is provided for the automotive transport of a cryogenic liquid fuel which in the course of transport is being consumed by an engine or the like. The fuel tank consists essentially of two containers, one for the cryogenic fuel and the other for a secondary cryogenic liquid which is used to cool the fuel during storage when no fuel is being consumed. By the method of the invention the build up of fuel vapor pressure during storage is avoided and the vapor pressure maintained at a predetermined level. The fuel tank described herein was two distinct modes of operation, namely, the fuel storage mode and the fuel supply mode. In the fuel storage mode the cryogenic fuel is being stored for later use while the secondary fluid is being used as a heat sink for the heat absorbed by the tank from the environment. In the fuel supply mode fuel is being supplied by the tank for consumption both as a liquid and as a gas while the secondary fluid is being restored to its initial state of lower temperature by the use of a refrigerator which employs the fuel as a heat sink. The two containers are thermally insulated from the outside environment as well as from each other. The fuel container and the secondary fluid container are connected by a heat transfer bridge which permits heat flow from the fuel to the secondary fluid only during the storage mode of operation. The fuel container has two fuel discharge connections, one carrying the liquid fuel the other carrying gaseous fuel which is vaporized within the fuel container. The pressure in the fuel container is maintained at an adequate level for the fuel supply to proceed without the need for a fuel pump.

34 Claims, 3 Drawing Figures

CRYOGENIC FUEL TANK

BACKGROUND OF THE INVENTION

Heretofore various types of cryogenic fuel tanks have been employed in an attempt to contain highly volatile fuels, such as Liquid Natural Gas, at acceptable pressure and with limited venting. In all cases the design emphasis has been placed on reducing the heat flow from the environment to the tank by well engineered thermal insulation. In the U.S. Pat. No. 2,795,937 a second fluid is cooled by the evaporating fue' during its use by an engine, the behaviour of the tank during storage periods being identical to that of any thermally insulated tank.

Since the heat flux from the environment to the fuel reserve cannot be completely eliminated, no matter how good the insulation, all existing designs of cryogenic fuel tanks present the undesirable features of venting or leaking part of the fuel and of uncontrollable variations of the fuel pressure in the tank which may present hazards or impair the proper performance of the engine. These disadvantages have been eliminated by the present invention which employs a secondary cryogenic liquid to absorb the heat flow from the surroundings, the secondary fluid being maintained at a lower temperature than that of the fuel by the aid of a refrigeration system operated between the secondary liquid and the fuel reserve.

SUMMARY OF THE INVENTION

It is the object of this invention to provide a cryogenic fuel tank for the automotive transport and use of fuels with very low boiling points, such as Liquid Natural Gas, which is efficient and safe in operation.

The cryogenic fuel tank of the instant invention consists of two containers, one for the cryogenic fuel, the other for a secondary cryogenic liquid, between which a refrigeration cycle is operated, the whole ensemble being insulated from the surroundings to inhibit heat leak to the fuel and secondary fluid. Since it is not possible to eliminate the heat leak completely the pressure in the containers will have a tendency to rise during prolonged periods of storage. In order to maintain the pressure in the fuel container at an adequate and constant level the present invention makes use of a refrigeration system and a heat transfer bridge between the two containers. During the periods of engine operation, when fuel is being extracted from the tank, the refrigeration system is operated between the fuel as its heat sink and the secondary fluid as its refrigerated medium. In this way, the temperature of the secondary fluid is depressed. The heat rejected to the fuel will cause some of the fuel to be vaporized. However, since fuel is being continuously extracted from the tank for use in the engine the pressure in the fuel container will not rise. Subsequently, during periods of storage, the heat transfer bridge between the two containers allows heat to flow from the fuel to the cool secondary fluid, under controlled conditions, such that the pressure in the fuel container is maintained at a constant level.

The refrigeration cycle can be a gas, vapor or Peltier effect cycle with the high temperature heat exchanger embedded in the fuel reserve and the low temperature heat exchanger embedded in the secondary fluid. The exchangers are preferably installed at the bottom of the corresponding container so as to keep them submerged regardless of the liquid level.

The heat transfer bridge between the two containers may consist of a metal tube loop carrying the secondary fluid in and out of the fuel container. In this way heat is transferred from the fuel to the secondary fluid which is boiled off and returned to the secondary fluid container where it recondenses. The heat transfer bridge can be provided with a value controlled by the pressure in the fuel container. Alternatively, the heat transfer bridge may consist simply of a metal conduction rod connecting the two containers if the fuel pressure need not be kept at a constant level.

If a gas refrigeration cycle is employed the refrigeration system will include a compressor and an expander which both can be of the piston type or the bellows type. The working fluid in the refrigeration cycle is selected so that it remains a gas over the entire range of pressure and temperature. For example, with Liquid Natural Gas as the cyrogenic fuel and Liquid Nitrogen as the secondary fluid, the working fluid can be Hydrogen. A bellows type compressor/expander may be preferable since it can be perfectly sealed to prevent loss of the working fluid.

Good thermal insulation of the tank is desirable in order to reduce the size and the power level of the refrigeration system. This can be accomplished by state of the art cryogenic insulation. The insulation may consist of an evacuated container in which both the fuel container and the secondary fluid container are housed. The evacuated enter space is filled with multilayer radiation insulation. In addition, the structural supports and all outside connections are designed for minimum heat transfer. The compressor/expander system is installed preferably outside the tank housing with connections to the fuel container and the secondary fluid container passing through the tank insulation. Besides these, the tank outside connections include the fuel inlet, the secondary fluid inlet, and gaseous fuel discharge and the liquid fuel discharge. In order to minimize the heat leak through the tank connections the length of the connecting tubing is greatly extended between the outside shell and the corresponding tank containers. The fuel container and the secondary fluid container are supported inside the insulation housing by low thermal conductivity spacers or by metal wires of high tensile strength.

These and other objects of the instant invention will become readily apparent as the following description is read in conjunction with the accompanying drawings wherein like reference numerals are used to refer to the different views.

DESCRIPTION OF THE PREFERRED EMBODIMENT

Figure 1:
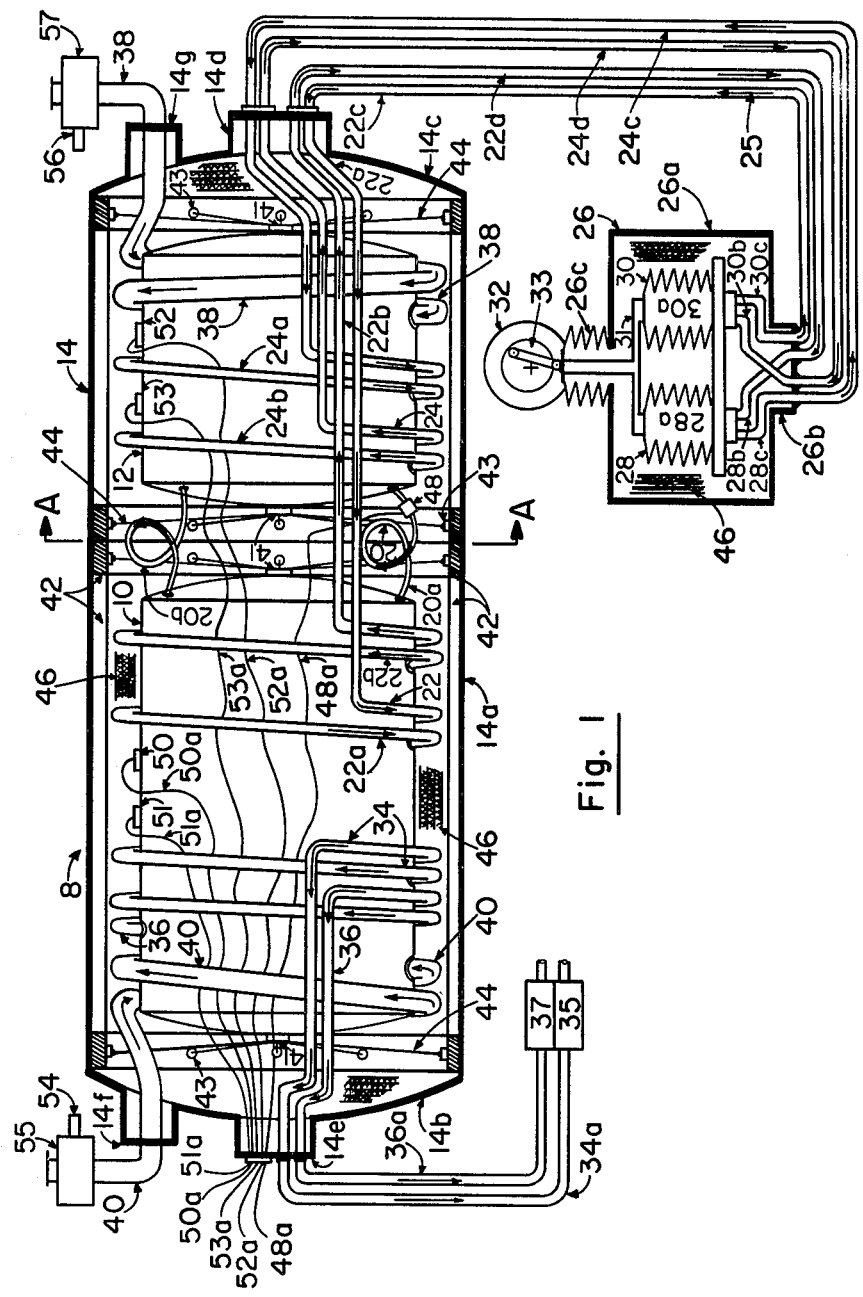
FIG. 1 is a longitudinal cross section of the fuel tank and a cross section of the refrigeration system.
Figure 2:
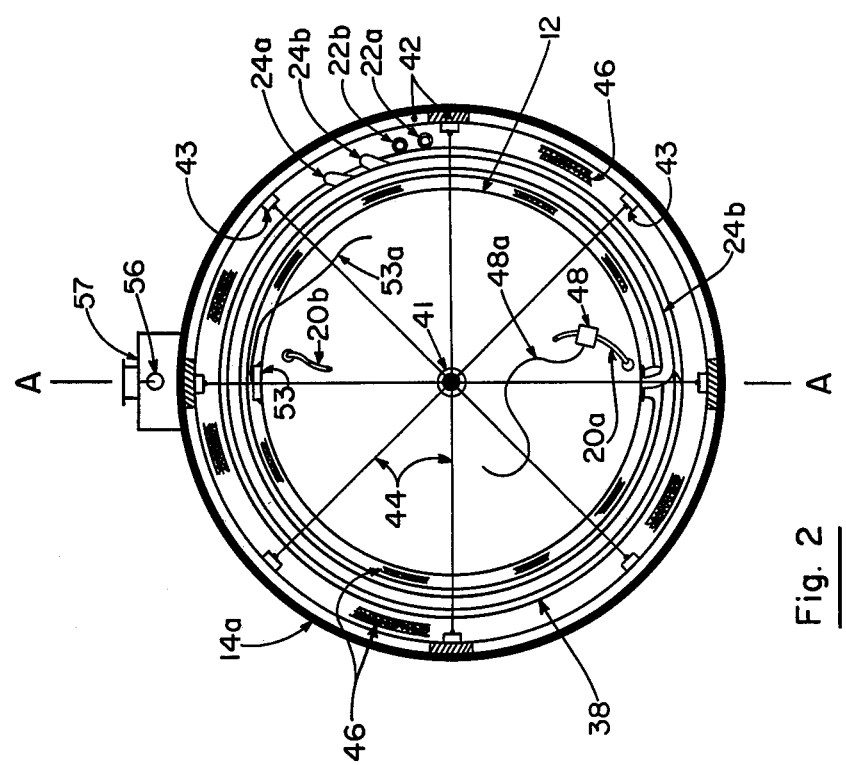
FIG. 2 is a sectional view taken along lines A—A of FIG. 1.
Figure 3:
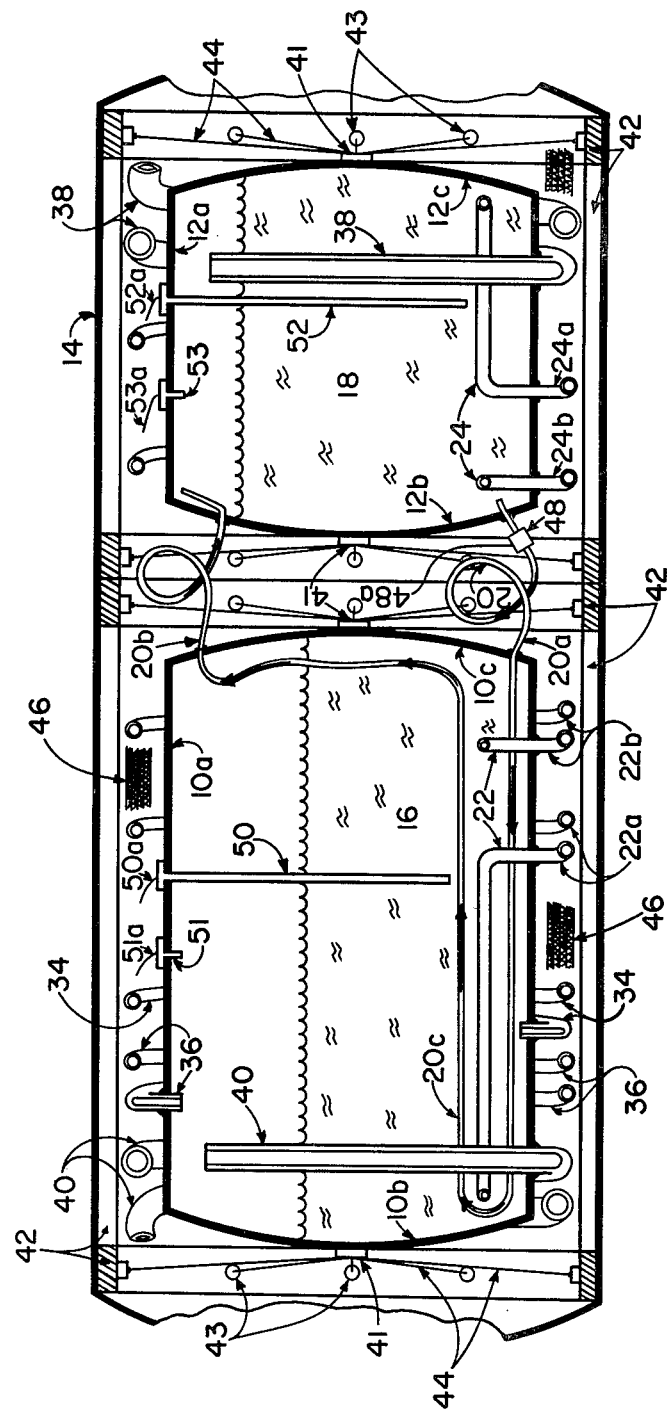
FIG. 3 is a longitudinal cross section of the fuel container and the secondary fluid container.

The fuel tank 8 is composed principally of the cryogenic fuel container 10 and the secondary fluid container 12. For the preferred embodiment the cryogenic fuel 16 contained in the fuel container 10 is Liquid Natural Gas. The secondary fluid 18 contained in the secondary fluid container 12 is Liquid Nitrogen. The cryogenic fuel container 10 is formed of a tubular member 10a and corresponding domed or dished ends 10b and 10c at their respective ends of tubular member 10a by means of welding or the like. The secondary fluid container 12 is formed of a tubular member 12a and corresponding domed or dished ends 12b and 12c affixed at their respective ends of tubular member 12a by means of welding or the like. The secondary fluid container and the fuel container are formed of materials commonly used at cryogenic temperatures, such as aluminum, nickel steel and the like. Located about the outside of the fuel container 10 and the secondary fluid container 12 is insulation 46 which consists of aluminum foil-fiberglass laminate commonly reffered to as multilayer insulation. An outer shell 14 is enclosing the containers 10 and 12 and the insulation 46. The outer shell 14 consists of a tubular member 14a and corresponding domed or dished ends 14b and 14c. The containers 10 and 12 are held in position inside shell 14 by use of high tensile strength wires 44. The wires 44 are attached to each end of containers 10 and 12 at the support attachment block 41 and are then anchored to the container support frame 42 at locations 43. The attachment blocks 41 are affixed to the respective ends by welding and the like. The support wires 44 are made of material with adequate tensile strength at cryogenic temperatures such as nickel steel. Other methods of supporting the containers 10 and 12 inside shell 14 can be also used such as employing several ring spacers about each container, made of nylon or other plastic material of low thermal conductivity. A vacuum is drawn in the cavity space between containers 10 and 12 and shell 14 to help create an effective heat barrier.

A gas refrigeration system is adopted consisting of compressor 30, expander 28, high temperature heat exchanger 22 and low temperature heat exchanger 24. The high temperature exchanger 22 is located inside and near the bottom of the cryogenic fuel container 10. It consists of a single tubular member 22 with inlet 22a and outlet 22b. The inlet and outlet ends 22a and 22b are sealed to container 10 entry points, by welding or the like, to maintain the integrity of container 10. Both inlet and outlet ends of tube 22 are greatly extended in length in the space between container 10 and shell 14. This is accomplished by coiling both extended ends about the outside of container 10. Both ends 22a and 22b of tube 22 pass through the shell 14, the entry points being sealed, by means of welding or the like, to maintain the integrity of shell 14. The low temperature exchanger 24 is located inside and near the bottom of the secondary fluid container 12. It consists of a single tubular member 24 with inlet 24a and outlet 24b. The inlet and outlet ends 24a and 24b are sealed to container 12 entry points, by means of welding or the like, to maintain the integrity of container 12. Both inlet and outlet ends of tube 24 are greatly extended in length in the space between container 12 and shell 14. This is accomplished by coiling both extended ends of tube 24 about the outside of container 12. Both ends 24a and 24b of tube 24 pass through the shell 14, the entry points being sealed, by means of welding or the like, to maintain the integrity of shell 14. Both the ends 22a and 22b of tube 22 and the ends of 24a and 24b of tube 24, upon exiting container 14, are connected to thermally insulated tubes 22c, 22d and 24c, 24d respectively. These tubes lead from the fuel tank 8 to the refrigeration unit 26. The refrigeration unit 26 consists mainly of compressor 30, expander 28 and driving motor 32. The compressor 30 consists of metal bellows 30a, gas inlet valve 30b and gas outlet valve 30c. The metal bellows material can be nickel steel or other metallic material which allows for proper functioning at cryogenic temperatures. The valves 30b and 30c are mechanically controlled. The gas inlet 30b and gas outlet 30c are connected to the refrigeration unit shell 26a at the extended portion of the shell 26b and are sealed, by means of welding or the like, to maintain the integrity of the refrigeration unit shell 26a. The expander 28 consists of metal bellows 28a, gas inlet valve 28b and gas outlet valve 28c. The metal bellows material can be nickel steel or other metallic material which allows for proper functioning at cryogenic temperatures. The valves 28b and 28c are controlled mechanically. The gas inlet 28b and the gas outlet 28c are connected to the refrigeration unit shell 26a at the extended portion of the shell 26b and are sealed, by means of welding or the like, to maintain the integrity of the refrigeration unit shell 26a. Upon exiting the refrigeration unit shell 26a the gas inlets and outlets 30b, 28b and 30c, 28c are connected to the thermally insulated tubes 24d, 22d and 22c, 24c respectively. The bellows compressor 30 and bellows expander 28 are actuated by the actuator rod 31 which is connected both to compressor 30 and expander 28 and to bellows 26c which forms an integral part of the refrigeration unit shell 26a. The actuator rod 31 is actuated by bellows 26c which in turn is actuated by the crank assembly 33 connected to motor 32. The motor 32 and crank assembly 33 are housed outside of the refrigeration unit shell 26a. The space between the refrigeration unit and shell 26a is filled with multilayer insulation 46 and a vacuum is drawn on this cavity to ensure proper thermal insulation. As working fluid 25 of the refrigeration cycle hydrogen was selected for the preferred embodiment. Hydrogen presents the advantage of remaining a gas over the entire range of pressure and temperature of the refrigeration cycle. Hydrogen is also advantageous for it maintains a high specific heat value in the cryogenic temperature range covered by the cycle.

It can be noted that, although for this preferred embodiment a bellows type compressor/expander system has been selected, any appropriate refrigeration system of the piston type, the Peltier effect type or other can be employed.

Located inside and near the bottom of the fuel container 10 is the heat exchange portion 20c of the heat exchange bridge 20. The heat exchanger 20c consists of a single tubular member with an inlet end 20a which enters near the bottom of the fuel container 10 and an outlet end 20b which leaves near the top of container 10. During storage periods the secondary fluid 18 is allowed to fill the heat exchanger 20c by opening valve 48. In exchanger 20c heat is absorbed by the secondary fluid which vaporizes and returns to the secondary fluid tank 12 through the outlet end 20b. The valve 48 is controlled by the pressure in the fuel container 10 which thus is maintained at a constant predetermined level. The inlet and outlet ends 20a and 20b are sealed at their entry points, by means of welding or the like, to maintain the integrity of container 10. The end 20a of bridge 20 enters the secondary fluid container 12 near its bottom. End 20b of bridge 20 enters the secondary fluid container near its top. Both ends 20a and 20b are sealed at their entry points at container 12, by means of welding or the like, to maintain the integrity of container 12. The solenoidal valve 48 is positioned at tube end 20a just after it exits the secondary fluid container 12. The solenoidal valve 48 is actuated electrically by line 48a which has a greatly extended length in the space between containers 10 and 12 and the outside shell 14. The electrical line 48a leaves outside shell 14 through an electrical feedthrough at the extended portion of the outside shell 14e.

Passing out through the top of the fuel container 10 is the gaseous fuel extraction tube 36. The tube 36 is sealed at its exit point, by means of welding or the like, to maintain the integrity of the fuel container 10. Upon exiting container 10 the tube 36 is greatly extended in length by coiling it about the outside of the fuel container 10. The gaseous fuel extraction tube 36 passes through the outside shell 14 at the extended portion of the outside shell 14e where it is sealed, by means of welding or the like, to maintain the integrity of shell 14.

Passing out through the bottom of the fuel container 10 is the liquid extraction tube 34. Tube 34 is sealed at its exit point, by means of welding or the like, to maintain the integrity of the fuel container 10. Upon exiting container 10 the tube 34 is greatly extended in length by coiling it about the outside of the fuel container 10. The liquid fuel extraction tube 34 passes through the outside shell 14 at the shell's extended portion 14e where it is sealed, by means of welding or the like, to maintain the integrity of shell 14. Upon leaving the shell 14 both the gaseous fuel tube 36 and the liquid fuel tube 34 are connected respectively to the thermally insulated tubes 36a and 34a which carry the fuel to the engine.

Passing up through the bottom of the fuel container 10 and extending up to near the top of the fuel container 10 is the fuel charging tube 40. The charging tube 40 is sealed at its entry point, by means of welding or the like, to maintain the integrity of the fuel container 10. Upon exiting the fuel container 10 the tube 40 is greatly extended in length by coiling it about the outside of the fuel container 10. The fuel charging tube 40 passes through the outside shell 14 at the extended portion of the shell 14f where it is sealed, by means of welding or the like, to maintain the integrity of shell 14. Upon passing through the outside shell 14 the fuel charging line 40 is connected to the fuel charging valves 55 and the pressure relief valve 54.

Passing up through the bottom of the secondary fluid container 12 and extending up to near the top of the container 12 is the secondary fluid charging tube 38. Tube 38 is sealed at its entry point, by means of welding or the like, to maintain the integrity of the secondary fluid container 12. Upon exiting the secondary fluid container 12 the tube 38 is greatly extended in length by coiling it about the outside of the secondary fluid container 12. The secondary fluid charging tube 38 passes through the shell 14 at the extended portion of the shell 14g where it is sealed, by means of welding or the like, to maintain the integrity of shell 14. Upon passing through shell 14 the secondary fluid charging tube 38 is connected to the secondary fluid charging valve 57 and pressure relief valve 56.

Also passing into the fuel container 10 are two sensors 51 and 50. Sensor 51 is a pressure and temperature sensor and sensor 50 is a fuel level sensor. The sensors are sealed to the fuel container 10, by means of welding or the like, to maintain the integrity of the fuel container 10. The sensors are connected to the outside by sensor lines 51a and 50a which have greatly extended length in the space between the fuel container 10 and the outside shell 14. The sensor lines 51a and 50a leave shell 14 through an electrical feed-through at the extended portion of the shell 14e.

Also passing into the secondary fluid container 12 are two sensors 53 and 52. Sensor 53 is a pressure and temperature sensor and sensor 52 is a liquid level sensor. The sensors 53 and 52 are sealed to the secondary fluid container 12, by means of welding or the like, to maintain the integrity of the secondary fluid container 12. The sensors are connected to the outside by sensor lines 53a and 52a which have greatly extended length in the space between container 12 and the outside shell 14. The sensor lines 53a and 52a leave shell 14 through an electrical feed-through at the extended portion of the shell 14e.

OPERATION OF THE INVENTION

The cryogenic fuel tank of the instant invention has two distinct modes of operation, the fuel storage mode and the fuel supply mode.

In the fuel storage mode of operation the cryogenic fuel 16 is being stored for later use. It is the major object of the present invention to allow the storage of high volatile cryogenic fuels over extended periods of time by avoiding the build up of the fuel vapor pressure and the necessity of venting. Due to the extreme volatility of cryogenic fuels even small quantities of heat leaked into the fuel container from the surroundings lead to a rapid pressure build up which may overcome the safety level if fuel is not being used by the engine. Hence the necessity of venting which affects all cryogenic fuel tanks designed to the present time. In the cryogenic fuel tank according to the present invention the pressure build up and subsequent venting are eliminated by flushing periodically cool secondary fluid 18 from a secondary fluid container 12 through the heat exchanger bridge 20 which is inserted in the fuel container 10. The secondary fluid 18 which is admitted into the heat exchange bridge 20 is boiled off by heat absorbed from the fuel reserve and returns as a vapor to container 12 where it recondenses. In this manner, during the storage mode, heat is continuously extracted from the fuel reserve 16 and dumped into the secondary fluid 18. The net result is that the entire quantity of heat leaked in from the surroundings ends up in the secondary fluid. The secondary fluid temperature rises during the storage mode while the temperature (and pressure) in the fuel container remains unchanged during a period of storage.

In the fuel supply mode of operation fuel is being released from the fuel container 10 and is being consumed by an engine or the like, while a refrigeration system is operated between container 10 and 12, removing heat from the secondary fluid container 12 and dumping it into the fuel container 10. The heat thus added to the fuel container serves to vaporize part of the fuel and maintain the pressure level required for the adequate supply of fuel to the engine. The heat extracted from the secondary fluid serves to restore its initial state of low temperature required for the next period of storage.

Of course, since the secondary fluid temperature cannot be lowered indefinitely, preferably not below its freezing point, the extent of a period of storage will be ultimately determined by the quantity of secondary fluid 18 carried along. Nevertheless, with even a relatively modest quantity of secondary fluid the periods of storage without recourse to venting the secondary fluid 18 or the fuel 16 are sufficiently large for most practical applications. Thus, e.g., in the case of the preferred embodiment described in the above, a well insulated tank with a capacity of 20 gallons of Liquid Natural Gas as the fuel and 10 gallons of Liquid Nitrogen as secondary fluid can store without venting fuel for periods of well over a month. Should the period of storage exceed an interval of time determined by the total heat capacity of the secondary fluid 18 the pressure in the secondary fluid container 12 will increase above a predetermined safety level and a quantity of secondary fluid will be automatically vented through vent 6. This process will continue until all the secondary fluid has been vented or the mode of operation changed. If, after all of the secondary fluid 18 has been vented, the tank is still in the storage mode, the pressure in the fuel container 10 will increase above a predetermined safety level and a quantity of gaseous fuel will be automatically vented through vent 54. This process will continue until all of the fuel has been vented or the mode of operation changed. If during the course of storage any of the secondary fluid 18 has been lost due to venting it should be replaced. An alarm may be actuated by pressure sensor 53 in the secondary fluid container 12 to warn the operator of high pressure before any of the secondary fluid 18 has been vented.

In the fuel supply mode of operation fuel is being supplied from the tank in both gaseous and liquid form. The gaseous fuel leaves through the gaseous fuel tube 36 which connects to the gaseous fuel line 36a and the gaseous fuel control valve 37. The liquid fuel leaves through the liquid fuel tube 34 which connects to the thermally insulated liquid fuel line 34a and the liquid fuel control valve 35. The pressure inside the fuel container 10, which is monitored by sensor 51, is controlled by operating refrigeration unit 26 and valve 37 in response to the rate of fuel consumption.

The cryogenic fuel container 10 is filled to the appropriate level with cryogenic fuel 16 through the fuel charging tube 40 which is connected to the fuel charging valve 55. The fuel level is monitored by sensor 50. The secondary fluid container 12 is filled to the appropriate level with secondary cryogenic fluid 18 via the secondary fluid charging valve 57. The level of the secondary fluid 18 is monitored by sensor 52.

It is contemplated that various changes and modifications can be made to the cryogenic fuel tank of the current preferred embodiment without departure from the spirit and scope of the invention as defined by the following claims.

We claim:

1. A cryogenic fuel tank for use with an engine which when operating consumes the cryogenic fuel, the fuel tank comprising:
    a fluid-tight cryogenic fuel container having first and second ends and containing a quantity of cryogenic fuel,
    a fluid-tight secondary cryogenic fluid container having first and second ends and containing a quantity of secondary cryogenic fluid,
    a refrigeration system comprising a high temperature heat exchanger, a low temperature heat exchanger, a compressor, an expander and refrigeration working fluid,
    said high temperature heat exchanger being located in said cryogenic fuel container and being part of said refrigeration system,
    said low temperature heat exchanger being located in said secondary cryogenic fluid container and being part of said refrigeration system,
    said refrigeration system periodically transferring heat from said secondary cryogenic fluid to said cryogenic fuel when said engine is consuming said cryogenic fuel,
    a heat exchange bridge passing through said cryogenic fuel container and being connected to said secondary cryogenic fluid container,
    said heat exchange bridge periodically transferring heat from said cryogenic fuel to said secondary cryogenic fluid when said engine is not consuming said cryogenic fuel,
    a fluid-tight outside shell having first and second ends and enclosing said cryogenic fuel container and said secondary cryogenic fluid container,
    a means of supporting said cryogenic fuel container and said secondary cryogenic fluid container within said outside shell,
    a means for filling said cryogenic fuel container with said cryogenic fuel,
    a means for extracting said cryogenic fuel from said cryogenic fuel container,
    a means for filling said secondary cryogenic fluid container with said secondary cryogenic fluid,
    a means for venting said cryogenic fuel from said cryogenic fuel container,
    a means for venting said secondary cryogenic fluid from said secondary cryogenic fluid container,
    a means for thermally insulating said cryogenic fuel container and said secondary cryogenic fluid container and said refrigeration system.

2. The cryogenic fuel tank of claim 1 wherein said cryogenic fuel is Liquid Natural Gas.

3. The cryogenic fuel tank of claim 2 wherein said secondary cryogenic fluid is Liquid Nitrogen.

4. The cryogenic fuel tank of claim 2 wherein said refrigeration working fluid is Hydrogen.

5. The cryogenic fuel tank of claim 1 wherein said cryogenic fuel is Liquid Hydrogen.

6. The cryogenic fuel tank of claim 5 wherein said secondary cryogenic fluid is Liquid Hydrogen.

7. The cryogenic fuel tank of claim 6 wherein said refrigeration working fluid is Hydrogen.

8. The cryogenic fuel tank of claim 5 wherein said secondary cryogenic fluid is Liquid Helium.

9. The cryogenic fuel tank of claim 8 wherein said refrigeration working fluid is Helium.

10. The cryogenic fuel tank of claim 1 or 2 wherein said refrigeration system utilizes a gas refrigeration cycle.

11. The cryogenic fuel tank of claim 1 wherein said refrigeration system utilizes a vapor refrigeration cycle.

12. The cryogenic fuel tank of claim 11 wherein said expander consists of an expansion valve.

13. The cryogenic fuel tank of claim 1 wherein said heat exchange bridge consists of a metal tube carrying said secondary cryogenic fluid.

14. The cryogenic fuel tank of claim 13 wherein said heat exchange bridge also comprises a means to control the flow of said secondary cryogenic fluid.

15. The cryogenic fuel tank of claim 1 wherein said heat exchange bridge consists of a heat conducting metal rod.

16. The cryogenic fuel tank of claim 1 wherein said means for supporting consists of high tensile strength wires strung from the ends of said cryogenic fuel container and the ends of said secondary cryogenic fluid container to attachment points on a metal frame attached to said outside shell.

17. The cryogenic fuel tank of claim 1 wherein said means for thermally insulating includes extending the length of all tubes connected between said cryogenic fuel container and said outside shell and between said secondary cryogenic fluid container and said outside shell by coiling the tubes about the outside of their respective containers.

18. The cryogenic fuel tank of claim 1 wherein said compressor and said expander are of the piston-cylinder type.

19. The cryogenic fuel tank of claim 1 wherein said compressor and said expander are constructed of metal bellows.

20. The cryogenic fuel tank of claim 1 wherein said compressor and said expander are housed in a fluid-tight thermally insulated container and actuated via an actuating rod and metal bellows by a cranking assembly and motor located outside the thermally insulating container.

21. The cryogenic fuel tank of claim 1 further comprising a means to monitor the pressure and temperature of said cryogenic fuel container and said secondary cryogenic fluid container.

22. The cryogenic fuel tank of claim 1 further comprising a means to monitor the liquid level of said cryogenic fuel and of said secondary cryogenic fluid.

23. The cryogenic fuel tank of claim 1 further comprising a means to control the pressure in said cryogenic fuel container.

24. A cryogenic fuel tank for use with a device which when operating consumes the cryogenic fuel, the fuel tank comprising:
a cryogenic fuel container containing a quantity of cryogenic fuel,
a secondary cryogenic fluid container containing a quantity of secondary cryogenic fluid,
a refrigeration system,
said refrigeration system periodically transferring heat from said secondary cryogenic fluid to said cryogenic fuel when said device is consuming said cryogenic fuel, and
a heat exchange bridge,
said heat exchange bridge periodically transferring heat from said cryogenic fuel to said secondary cryogenic fluid when said device is not consuming said cryogenic fuel.

25. The cryogenic fuel tank of claim 24 wherein said refrigeration system consists of a Peltier effect refrigeration unit.

26. The cryogenic fuel tank of claim 24 wherein said refrigeration system utilizes said secondary cryogenic fluid for the working fluid of the refrigeration cycle.

27. The cryogenic fuel tank of claim 24 wherein said cryogenic fuel is Liquid Natural Gas and said secondary cryogenic fluid is Nitrogen and refrigeration working fluid is Nitrogen.

28. The cryogenic fuel tank of claim 24 further comprising a means for filling said cryogenic fuel container with said cryogenic fuel.

29. The cryogenic fuel tank of claim 24 further comprising a means for extracting said cryogenic fuel from said cryogenic fuel container.

30. The cryogenic fuel tank of claim 24, further comprising a means for filling said secondary cryogenic fluid container with said secondary cryogenic fluid.

31. The cryogenic fuel tank of claim 24 further comprising a means for venting said cryogenic fuel from said cryogenic fuel container.

32. The cryogenic fuel tank of claim 24 further comprising a means for venting said secondary cryogenic fluid from said secondary cryogenic fluid container.

33. The cryogenic fuel tank of claim 24 further comprising a means for thermally insulating said cryogenic fuel container and said secondary cryogenic fluid container and said refrigeration system.

34. The cryogenic fuel tank of claim 24 further comprising a means of monitoring and controlling all said filling, extracting and venting means.

* * * * *

UNITED STATES PATENT AND TRADEMARK OFFICE
CERTIFICATE OF CORRECTION

PATENT NO. : 4,292,062

DATED : September 29, 1981

INVENTOR(S) : Nicholas A. Sanders and Horia A. Dinulescu

It is certified that error appears in the above-identified patent and that said Letters Patent are hereby corrected as shown below:

Abstract, Column 2, line 6, change "was" before "two" to --has--.
Column 1, line 13, change "fue'" after "evaporating" to --fuel--.
Column 7, line 11, change "6" to --56--.
Column 8, Claim 2, line 1, change "1" to --1 or 24--.
Column 8, Claim 5, line 1, change "1" to --1 or 24--.
Column 8, Claim 10, line 1, change "1 or 2" to --1 or 24--.
Column 8, Claim 11, line 1, change "1" to --1 or 24--.
Column 8, Claim 13, line 1, change "1" to --1 or 24--.
Column 8, Claim 15, line 1, change "1" to --1 or 24--.
Column 9, Claim 21, line 1, change "1" to --1 or 24--.
Column 9, Claim 22, line 1, change "1" to --1 or 24--.
Column 9, Claim 23, line 1, change "1" to --1 or 24--.

Signed and Sealed this

Fifteenth Day of December 1981

[SEAL]

Attest:

GERALD J. MOSSINGHOFF

*Attesting Officer*   *Commissioner of Patents and Trademarks*